United States Patent
Norrie et al.

(10) Patent No.: US 12,271,337 B2
(45) Date of Patent: Apr. 8, 2025

(54) TRANSPARENT REMOTE MEMORY ACCESS OVER NETWORK PROTOCOL

(71) Applicant: Enfabrica Corporation, Mountain View, CA (US)

(72) Inventors: Thomas Norrie, Mountain View, CA (US); Shrijeet Mukherjee, Mountain View, CA (US); Rochan Sankar, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

(21) Appl. No.: 17/836,532

(22) Filed: Jun. 9, 2022

(65) Prior Publication Data

US 2022/0398215 A1 Dec. 15, 2022

Related U.S. Application Data

(60) Provisional application No. 63/208,622, filed on Jun. 9, 2021.

(51) Int. Cl.
*H04L 9/08* (2006.01)
*G06F 13/40* (2006.01)
(Continued)

(52) U.S. Cl.
CPC ...... *G06F 15/17331* (2013.01); *G06F 13/404* (2013.01); *G06F 13/4221* (2013.01); *H04L 9/0863* (2013.01); *G06F 2213/0026* (2013.01)

(58) Field of Classification Search
CPC ............ G06F 15/17331; H04L 9/0863; H04L 9/3213
See application file for complete search history.

(56) References Cited

U.S. PATENT DOCUMENTS 6,594,712 B1 * 7/2003 Pettey ................. G06F 13/385
710/36
6,667,974 B1 12/2003 Shigeta
(Continued)

FOREIGN PATENT DOCUMENTS

EP 2768188 8/2014
EP 3661141 6/2020
(Continued)

OTHER PUBLICATIONS

U.S. Appl. No. 17/570,261, filed Jan. 6, 2022, Server Fabric Adapter for I/O Scaling of Heterogeneous and Accelerated Compute Systems, Sankar, et al.
(Continued)

*Primary Examiner* — Atta Khan
*Assistant Examiner* — Wuji Chen
(74) *Attorney, Agent, or Firm* — Goodwin Procter LLP

(57) ABSTRACT

A system for providing memory access is disclosed. In some embodiments, the system is configured to receive at a source server fabric adapter (SFA), from a server, a memory access request comprising a virtual memory address; using associative mapping, determining whether the virtual address corresponds to a source-local memory associated with the source SFA or to a remote memory. If the virtual address corresponds to the source-local memory, the virtual memory address is translated, at the source SFA, into a physical memory address of the source-local memory. If the virtual address corresponds to the remote memory, a request message is synthesized, and the synthesized request message is transmitted to the destination SFA using a network protocol.

14 Claims, 4 Drawing Sheets

(51) Int. Cl.
  *G06F 13/42* (2006.01)
  *G06F 15/173* (2006.01)

(56) References Cited

U.S. PATENT DOCUMENTS

| | | | |
|---|---|---|---|
| 7,181,541 B1* | 2/2007 | Burton | H04L 69/12 |
| | | | 710/305 |
| 7,293,129 B2 | 11/2007 | Johnsen et al. | |
| 7,937,447 B1 | 5/2011 | Cohen et al. | |
| 8,301,717 B2* | 10/2012 | Deshpande | G06F 12/1009 |
| | | | 709/216 |
| 8,719,456 B2* | 5/2014 | Wilkinson | H04L 49/254 |
| | | | 710/5 |
| 8,917,734 B1 | 12/2014 | Brown | |
| 9,164,702 B1 | 10/2015 | Nesbit et al. | |
| 9,448,901 B1* | 9/2016 | Aslam | G06F 11/2094 |
| 9,648,102 B1 | 5/2017 | Davis et al. | |
| 9,684,597 B1* | 6/2017 | Eiriksson | G06F 12/082 |
| 9,864,519 B2* | 1/2018 | Meyer | G06F 3/0673 |
| 9,934,152 B1* | 4/2018 | Bryant | G06F 12/0895 |
| 10,152,428 B1* | 12/2018 | Alshawabkeh | G06F 11/34 |
| 10,169,279 B2 | 1/2019 | Yokoyama | |
| 10,374,945 B1 | 8/2019 | Dhanabalan et al. | |
| 10,447,767 B2* | 10/2019 | Baptist | H04L 67/51 |
| 10,503,658 B2* | 12/2019 | Basu | G06F 11/3433 |
| 10,778,521 B2 | 9/2020 | Liguori et al. | |
| 10,880,204 B1 | 12/2020 | Shalev et al. | |
| 2001/0046212 A1 | 11/2001 | Nakajima | |
| 2002/0071450 A1 | 6/2002 | Gasbarro et al. | |
| 2002/0078271 A1* | 6/2002 | Berry | G06F 13/385 |
| | | | 710/36 |
| 2002/0129272 A1* | 9/2002 | Terrell | H04L 69/03 |
| | | | 726/15 |
| 2002/0159385 A1 | 10/2002 | Susnow et al. | |
| 2002/0184452 A1* | 12/2002 | Simmons | G06F 13/1684 |
| | | | 711/150 |
| 2002/0191599 A1* | 12/2002 | Parthasarathy | G06F 9/3867 |
| | | | 712/E9.032 |
| 2003/0058875 A1 | 3/2003 | Arndt et al. | |
| 2003/0154412 A1 | 8/2003 | Hetzler et al. | |
| 2004/0049603 A1* | 3/2004 | Boyd | H04L 67/1097 |
| | | | 710/1 |
| 2005/0068798 A1 | 3/2005 | Lee et al. | |
| 2005/0080920 A1 | 4/2005 | Bender et al. | |
| 2005/0089033 A1 | 4/2005 | Gupta et al. | |
| 2005/0223118 A1 | 10/2005 | Tucker et al. | |
| 2006/0004941 A1* | 1/2006 | Shah | G06F 12/1027 |
| | | | 711/3 |
| 2006/0056405 A1 | 3/2006 | Chang et al. | |
| 2006/0059242 A1 | 3/2006 | Blackmore et al. | |
| 2006/0236063 A1* | 10/2006 | Hausauer | G06F 12/1081 |
| | | | 711/170 |
| 2006/0242352 A1 | 10/2006 | Torudbakken et al. | |
| 2006/0271713 A1 | 11/2006 | Xie et al. | |
| 2007/0038794 A1 | 2/2007 | Purcell et al. | |
| 2007/0104102 A1 | 5/2007 | Opsasnick | |
| 2007/0255802 A1 | 11/2007 | Aloni et al. | |
| 2007/0283123 A1* | 12/2007 | Vick | G06F 12/10 |
| | | | 711/E12.013 |
| 2008/0043732 A1* | 2/2008 | Desai | H04L 67/1097 |
| | | | 370/389 |
| 2008/0168194 A1 | 7/2008 | Gregg | G06F 13/4059 |
| | | | 710/52 |
| 2009/0083392 A1 | 3/2009 | Wong et al. | |
| 2009/0172301 A1 | 7/2009 | Ebersole et al. | |
| 2010/0064070 A1* | 3/2010 | Yoshimura | G06F 13/128 |
| | | | 710/22 |
| 2010/0232448 A1 | 9/2010 | Sugumar et al. | |
| 2011/0072234 A1* | 3/2011 | Chinya | G06F 12/1036 |
| | | | 711/E12.001 |
| 2011/0268119 A1 | 11/2011 | Pong et al. | |
| 2011/0271010 A1* | 11/2011 | Kenchammana | H04L 67/1097 |
| | | | 709/244 |
| 2013/0024591 A1 | 1/2013 | Sun | |
| 2013/0031328 A1* | 1/2013 | Kelleher | G06F 12/06 |
| | | | 711/E12.016 |
| 2013/0132536 A1 | 5/2013 | Zhang et al. | |
| 2013/0318322 A1* | 11/2013 | Shetty | G06F 3/0631 |
| | | | 711/E12.078 |
| 2014/0237156 A1 | 8/2014 | Regula et al. | |
| 2015/0026286 A1 | 1/2015 | Sharp et al. | |
| 2015/0082000 A1* | 3/2015 | Hong | G06F 12/1027 |
| | | | 711/205 |
| 2015/0089009 A1* | 3/2015 | Tsirkin | G06F 12/08 |
| | | | 709/212 |
| 2016/0070475 A1* | 3/2016 | Zhang | G06F 3/0604 |
| | | | 711/156 |
| 2016/0085450 A1* | 3/2016 | Ahn | G06F 3/067 |
| | | | 711/154 |
| 2016/0162422 A1 | 6/2016 | Weber | |
| 2016/0269305 A1 | 9/2016 | Sreeramoju et al. | |
| 2017/0097909 A1 | 4/2017 | Simionescu et al. | |
| 2017/0132148 A1* | 5/2017 | Liu | G06F 12/1009 |
| 2017/0177520 A1 | 6/2017 | Kampe et al. | |
| 2017/0185528 A1* | 6/2017 | Hansson | G06F 12/1009 |
| 2017/0372088 A1* | 12/2017 | Zhao | G06F 21/6218 |
| 2018/0024938 A1* | 1/2018 | Paltashev | G06F 12/128 |
| | | | 711/133 |
| 2018/0046411 A1 | 2/2018 | Coburn et al. | |
| 2018/0176134 A1 | 6/2018 | Pignataro et al. | |
| 2018/0191623 A1 | 7/2018 | Marty et al. | |
| 2018/0198715 A1 | 7/2018 | Shmilovici et al. | |
| 2019/0141041 A1* | 5/2019 | Bhabbur | H04L 9/3228 |
| 2019/0173810 A1* | 6/2019 | Shpiner | H04L 47/6225 |
| 2019/0196978 A1* | 6/2019 | Basu | G06F 12/1027 |
| 2019/0220425 A1 | 7/2019 | Zemach et al. | |
| 2019/0258415 A1 | 8/2019 | Imamura | |
| 2019/0294366 A1 | 9/2019 | Kawamura et al. | |
| 2019/0320019 A1 | 10/2019 | Hamrick, Jr. | |
| 2019/0324917 A1* | 10/2019 | Cui | G06F 12/0284 |
| 2019/0370173 A1* | 12/2019 | Boyer | G06F 12/0815 |
| 2019/0379767 A1 | 12/2019 | Sharma et al. | |
| 2020/0004685 A1* | 1/2020 | Guim Bernat | G06F 11/3037 |
| 2020/0119753 A1* | 4/2020 | Chirca | H03M 13/276 |
| 2020/0159669 A1* | 5/2020 | Duncan | G06F 12/1027 |
| 2020/0177513 A1 | 6/2020 | Zhang | |
| 2020/0204489 A1 | 6/2020 | Pianigiani et al. | |
| 2020/0236052 A1 | 7/2020 | Srinivasan et al. | |
| 2020/0280518 A1 | 9/2020 | Lee et al. | |
| 2020/0371955 A1* | 11/2020 | Goodacre | G06F 12/0811 |
| 2020/0387405 A1* | 12/2020 | Xiao | G06F 12/109 |
| 2021/0019069 A1* | 1/2021 | Sen | G06F 12/122 |
| 2021/0037107 A1* | 2/2021 | Klenk | H04L 12/1886 |
| 2021/0075633 A1 | 3/2021 | Sen et al. | |
| 2021/0083981 A1 | 3/2021 | Shmilovici et al. | |
| 2021/0232312 A1* | 7/2021 | Prasad | G06F 12/0246 |
| 2021/0234706 A1* | 7/2021 | Nair | H04L 9/0825 |
| 2021/0345112 A1* | 11/2021 | Elliott | H04W 12/122 |
| 2022/0060422 A1 | 2/2022 | Sommers | |
| 2022/0085916 A1* | 3/2022 | Debbage | H04L 1/1635 |
| 2022/0109587 A1 | 4/2022 | Sapio et al. | |
| 2022/0200906 A1 | 6/2022 | Ye et al. | |
| 2022/0214912 A1* | 7/2022 | Julien | G06F 9/5072 |
| 2022/0217085 A1* | 7/2022 | Sankar | H04L 69/18 |
| 2022/0222118 A1* | 7/2022 | Wang | G06F 12/1063 |
| 2022/0283964 A1* | 9/2022 | Burstein | G06F 13/387 |
| 2022/0291875 A1* | 9/2022 | Diaz-Cuellar | G06F 9/455 |
| 2023/0044342 A1 | 2/2023 | Wilkinson | |
| 2023/0051781 A1 | 2/2023 | Patel et al. | |
| 2023/0093247 A1 | 3/2023 | Kumar et al. | |
| 2023/0096451 A1 | 3/2023 | Johnson et al. | |
| 2024/0098023 A1 | 3/2024 | Guo | |
| 2024/0414087 A1 | 12/2024 | Ranjan et al. | |

FOREIGN PATENT DOCUMENTS

| | | |
|---|---|---|
| WO | WO-2005106693 A2 | 11/2005 |
| WO | WO-2009120798 A2 | 10/2009 |
| WO | WO-2020055921 A1 | 3/2020 |
| WO | WO-2022/005322 A1 | 1/2022 |

(56) References Cited

FOREIGN PATENT DOCUMENTS

WO  WO-2022108498 A1  5/2022
WO  WO-2022198552 A1  9/2022

OTHER PUBLICATIONS

U.S. Appl. No. 18/747,118, filed Jun. 18, 2024, Optimally Balanced Network Systems, Sankar, et al.
U.S. Appl. No. 18/778,611, filed Jul. 19, 2024, Server Fabric Adapter for I/O Scaling of Heterogeneous and Accelerated Compute Systems, Sankar, et al.
U.S. Appl. No. 18/755,372, filed Jun. 26, 2024, Transparent Remote Memory Access Over Network Protocol, Norrie, et al.
U.S. Appl. No. 17/886,026, filed Aug. 11, 2022, System and Method for Congestion Control Using a Flow Level Transmit Mechanism, Mukherjee, et al.
U.S. Appl. No. 18/102,033, filed Jan. 26, 2023, System and Method for One-Sided Read RMA Using Linked Queues, Mukherjee, et al.
U.S. Appl. No. 18/107,324, filed Feb. 8, 2023, System and Method for Using Dynamic Thresholds With Route Isolation for Heterogeneous Traffic in Shared Memory Packet Buffers, Aravinthan, et al.
U.S. Appl. No. 18/447,180, filed Aug. 9, 2023, System and Method for Ghost Bridging, Norrie, et al.
U.S. Appl. No. 18/666,548, filed May 16, 2024, System and Method for an Optimized Staging Buffer for Broadcast/Multicast Operations, Mukherjee, et al.
U.S. Appl. No. 18/526,727, filed Dec. 1, 2023, A Modular Datacenter Interconnection System, Skirmont, et al.
U.S. Appl. No. 18/785,542, filed Jul. 26, 2024, Method and System for Tracking and Moving Pages Within a Memory Hierarchy, Mukherjee, et al.
International Search Report and Written Opinion for International Patent Application No. PCT/US2022/011491, dated Mar. 24, 2022 (23 pages).
International Search Report and Written Opinion for International Patent Application No. PCT/US2022/32841, dated Nov. 21, 2022 (10 pages).
International Search Report and Written Opinion for International Patent Application No. PCT/US2022/74833, dated Dec. 6, 2022 (8 pages).
International Search Report and Written Opinion for International Patent Application No. PCT/US2023/062168, dated May 12, 2023 (54 pages).
International Search Report and Written Opinion for International Patent Application No. PCT/US2023/61405, dated Jul. 11, 2023 (6 pages).
NPT-Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Mar. 7, 2022 from: https://www.businesswire.com/news/home/20141215005718/en/Emulexprovides-1_0Gb-Ethernet-Vi_rtual-F_abri_c-Adapter-5-New-Lenovo-Ervers <https://www.businesswire.com/news/home/20141215005718/en/Emulexprovides-1%200Gb-Ethernet-Vi%20rtual-F%20abri%20c-Adapter-5-New-Lenovo-Ervers>enti re document.
International Search Report and Written Opinion for International Patent Application No. PCT/US2023/082132, dated Jun. 6, 2024 (8 pages).
International Search Report and Written Opinion for International Patent Application No. PCT/US2024/029723, dated Aug. 22, 2024 (14 pages).
"Using Non-transparent Bridging in PCI Express Systems," by Jack Regula, 20040601, Jun. 1, 2004, pp. 4-30, XP002686987, URL: http://www.plxtech.com/files/pdf/technical/expresslane/NontransparentBridging .pdf.
International Search Report and Written Opinion for International Patent Application No. PCT/2023/029887, dated Oct. 26, 2023 (13 pages).
International Search Report and Written Opinion for International Patent Application No. PCT/US2024/039765, dated Oct. 22, 2024 (15 pages).
U.S. Appl. No. 18/920,558, filed Oct. 18, 2024, System and Method for Optimally Balanced Network Multipathing, Shrijeet Mukhrjee, et al.
U.S. Appl. No. 19/034,371, filed Jan. 22, 2025, Input/Output System Interconnect Redundancy and Failover, Frederic Vecoven, et al.

* cited by examiner

TRANSPARENT REMOTE MEMORY ACCESS OVER NETWORK PROTOCOL

CROSS REFERENCE TO RELATED APPLICATION

This application claims the benefit of priority to U.S. Provisional Patent Application No. 63/208,622, filed Jun. 9, 2021, the entire contents of which are incorporated by reference herein.

TECHNICAL FIELD

This disclosure relates to a communication system that mediates memory accesses over a network protocol to an arbitrarily remote or local memory space.

BACKGROUND

A variety of techniques have been used to expose memory spaces over large network systems. Typically, these techniques or approaches use non-standard or boutique networking protocols and systems, which, however, cannot interoperate and perform well in widely-deployed standard networks such as transmission control protocol/internet protocol (TCP/IP) over Ethernet. Additionally, with the exception of cache-coherent non-uniform memory access (ccNUMA) systems, existing techniques cannot expose remote memory to processes in a load/store view as local memory is exposed. Instead, using existing techniques, remote memory is made available using interfaces for directing data movement between local and remote memory addresses. Therefore, it is desirable for a system that is built based on standard protocols and provides a unified view for local and remote memory access.

SUMMARY

To address the aforementioned shortcomings, a system for providing memory access is provided. In some embodiments, the system is configured to receive at a source server fabric adapter (SFA), from a server, a memory access request comprising a virtual memory address; using associative mapping, determining whether the virtual address corresponds to a source-local memory associated with the source SFA or to a remote memory. If the virtual address corresponds to the source-local memory, the virtual memory address is translated, at the source SFA, into a physical memory address of the source-local memory. If the virtual address corresponds to the remote memory, a request message is synthesized, and the synthesized request message is transmitted to the destination SFA using a network protocol.

In other embodiments, the system is also configured to receive at a destination server fabric adapter (SFA) from a source SFA coupled to a server, a request message comprising a request header and a request payload, the request payload comprising a memory access request comprising a virtual memory address; translate at the destination SFA, the virtual memory address into a physical memory address of a destination-local memory associated with the destination SFA; and perform a memory write or memory read operation according to the memory access request using the physical memory address.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure provides a system and method for mediating central processing unit (CPU) memory accesses over a network protocol to an arbitrarily remote or local memory space. The memory accesses may be loads or stores. The memory space may include random access memory (RAM), read-only memory (ROM), flash memory, dynamic RAM (DRAM), etc.

Advantageously, the system disclosed herein expands the memory capacity available for software beyond the memory capacity available in a single server. The present system also disaggregates memory into shared pools across a network system, thereby reducing resource cost. In addition, the present system supports memory-based communications between processes across traditional non-memory networks. Moreover, the present system supports fast virtual machine migration between servers with full or 100% availability, that is, no downtime from the perspective of a user. To achieve full availability, the present system allows a destination host to continue accessing/reading from the memory of the original source host during the migration and thus eliminate the need to aggressively pre-copy and transfer pages.

Overview Memory Access Method

Figure 1:
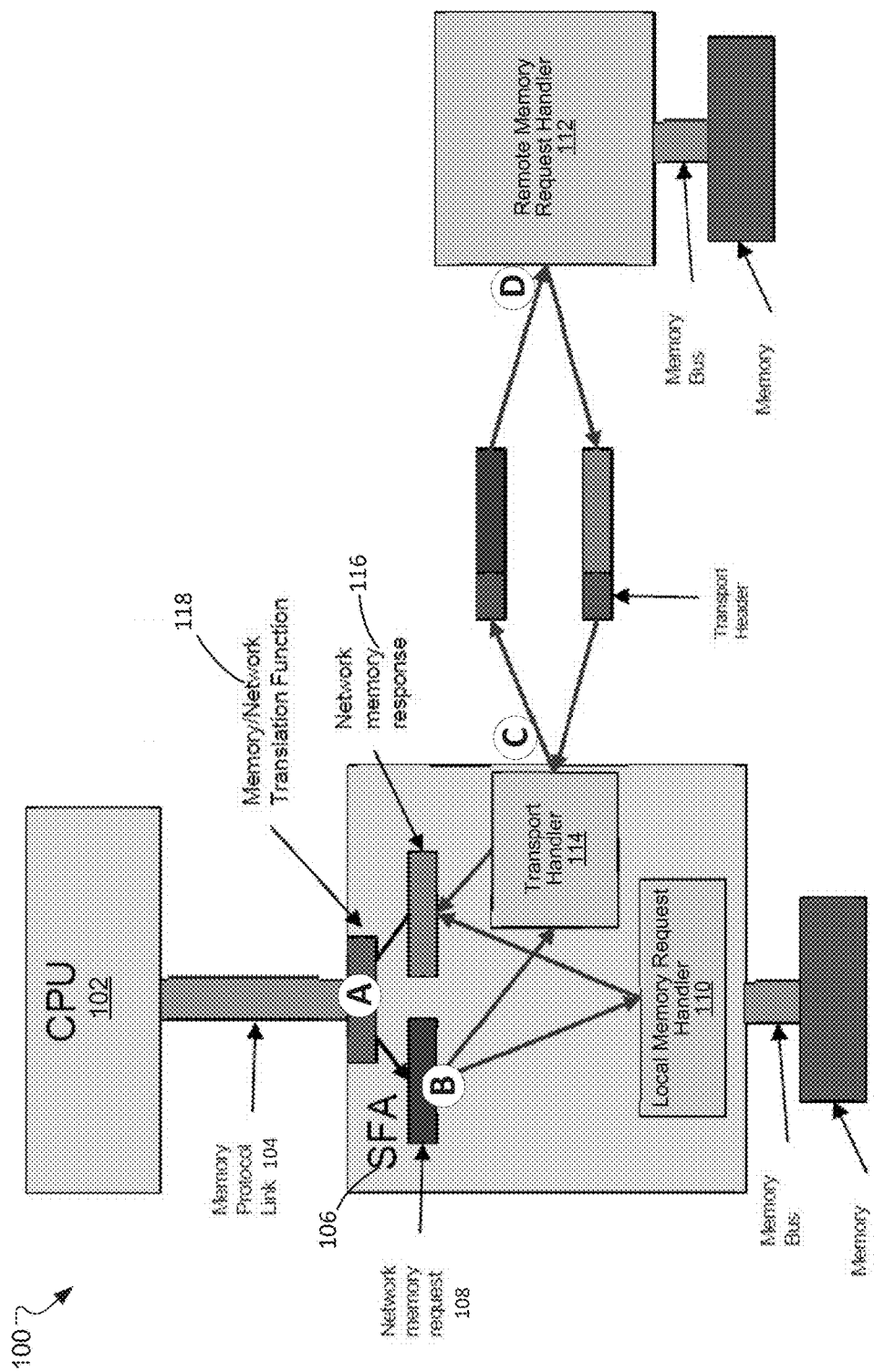
FIG. 1 illustrates an example system that performs an end-to-end process for memory requests and responses, according to some embodiments.

FIG. 1 illustrates an example system 100 that performs an end-to-end process for memory requests and responses, according to some embodiments. As depicted, a memory access request or memory request is received on a memory protocol link 104 by a server fabric adapter (SFA) 106. The memory request may be a cacheline read or write sent from a requester (e.g., a host) to a CPU 102. Memory protocol link 104 may be a compute express link (CXL), a peripheral component interconnect express (PCIe), or other types of links. In some embodiments, SFA 106 is a unified memory-plus-network switching chip. SFA 106 may connect to one or more controlling host CPUs (e.g., CPU 102), endpoints, and network ports, as shown below in FIG. 2. An endpoint may be an accelerator such as a graphics processing unit (GPU), field-programmable gate array (FPGA), or a storage or memory element such as a solid-state drive (SSD), etc. A network port may be an Ethernet port. In response to receiving the memory request, SFA 106 may translate it into a network memory request 108 using a translation function 118.

A memory request may be associated with a local memory reference/address, and a network memory request may be associated with a network memory reference/address. In some embodiments, the network memory address associated with network memory request 108 may identify a location of a memory request handler. The memory request handler may be locally attached to SFA 106, such as a local memory request handler 110. The memory request handler may also be remotely attached to SFA 106 through a standard network flow, such as a remote memory request handler 112.

SFA 106 may forward network memory request 108 to the memory request handler identified by the network memory address associated with network memory request 108. If the identified memory request handler is local, SFA 106 may deliver network memory request 108 to local memory request handler 110 included in SFA 106 without any transport assist. However, if the identified memory request handler is remote or a transport-assisted local handler (e.g., transport handler 114) is needed, SFA 106 may insert network memory request 108 into a standard network flow targeting remote memory request handler 112.

In some embodiments, transport handler 114 may apply transport headers to help transmit network memory request 108 to remote memory request handler 112. For example, the transport headers may include a TCP/IP header or a user datagram protocol (UDP)-based header that has a higher-level reliability protocol than TCP/IP. In some embodiments, transport handler 114 may be a kernel or user process running in software on a device attached to SFA 106, a software process running on SFA 106, or a hardware unit of SFA 106. Transport handler 114 may apply various network transport protocols in data communication. Typically, transport handler 114 may use a reliable transport protocol. But transport handler 114 may also use other transport protocols to transport data as long as reliability is handled at the memory request and/or memory response protocol layer.

When a memory request handler (e.g., 110 or 112) receives network memory request 108, it may execute the request and generate a memory response. This response may then be sent back to the requester that triggered the memory request, using the same transport schemes as described above. The same or even a different transport protocol may be used in transmitting the response to the requester. In some embodiments, the memory request may be handled in various implementations. For example, the memory request handling may be performed entirely in hardware, using embedded software (e.g., in the same style as a one-sided memory operation), or by looping through host software to assist in the response.

In some embodiments, once the memory response has been delivered over a transport layer or using the transport protocol, SFA 106 may convert the memory response into a memory protocol link response (e.g., a CXL response) over the same memory protocol link 104 as used for transmitting the request.

Through the entire process of handling a memory request, the SFA that originates the network memory request (e.g., SFA 106) may ensure that the memory protocol link (e.g., link 104) is fully terminated in the local and stays consistent despite any network behaviors (e.g., permanently lost packets). When the memory protocol link is fully terminated locally, all behaviors expected by the local protocol (e.g., CXL link) are provided and enforced locally such that SFA 106 can fully decode requests and then bridge the requests into new protocols (e.g., a network memory protocol). In this way, proper operation of the local CXL protocol may be ensured without any dependency on how the network memory protocol is behaving. In contrast, when tunneling the memory protocol (e.g., CXL protocol) over the network, the semantics of the two protocols may combine and cause certain behaviors of the network protocol to violate expectations of the CXL protocol (e.g., packet loss that leads to no response ever being returned to a request). Therefore, using locally terminating CXL, SFA 106 would parse and understand the CXL protocol, rather than treating the CXL protocol as an opaque data blob to be sent over a network tunnel. When the memory protocol link stays consistent, the local memory protocol will retain the correct spec-compliant operation. For example, all local memory protocol link resources can be freed on a local timeout, and any future network responses will be properly discarded. The end-to-end process for handling memory requests and responses is detailed below.

Translation

As described above, SFA 106 may translate a memory request from a requester into a network memory request 108, or translate a network memory response back to a response received by the requester, using a memory/network translation function 118. In some embodiments, SFA 106 may perform the translation at point A shown in FIG. 1. The translation may be performed by two types of functions:

Page table lookup

Associative range map

Using the page table lookup, SFA 106 may map upper bits of an incoming address (e.g., incoming page address) to a page table entry. The page table entry includes information of an outgoing page address. The incoming address is associated with a request/response to be translated, while the outgoing address is associated with a translated request/response. In some embodiments, SFA 106 may use a translation lookaside buffer (TLB) to cache the translations since page table entries are generally stored in DRAM.

Using the associative range map, SFA 106 may encode a set of linear memory ranges. If an incoming memory range falls within one of the linear memory ranges in the set, SFA 106 is able to determine an appropriate range map entry, and this range map entry contains information that may be used by SFA 106 to calculate an outgoing range address. In some embodiments, associative range maps are stored in on-chip associative structures, which are backed by SRAM or flip flops.

In some embodiments, both page table entry and range map (or multiple range maps) may be used to provide the translation for the same incoming address. In such cases, SFA 106 may prioritize the two functions using different mechanisms when translating the address.

In some embodiments, multiple incoming address ranges may alias or map to each other. Based on the aliased address spaces, a host system is able to provide access hints for different regions of memory. For example, incoming address X may be configured to indicate that access is likely non-temporal (e.g., unnecessary to cache) and small. But an incoming address X+N may be configured to indicate that access is temporal and bulk (e.g., indicating a high value for caching the entry and prefetching nearby entries). The virtual memory page tables on a host therefore may be configured to map to the incoming address option that provides the most appropriate hints. This mapping, therefore, adds the access hint information to the virtual memory page tables on the host. In some embodiments, when aliasing multiple address ranges, SFA 106 may be configured to take specific action for each aliased access to avoid confusion of memory coherency protocols running on a system. For example, only one memory channel may be allowed to be active at any given time for aliased accesses to a given memory region.

In some embodiments, SFA 106 may also be configured to enable fast and efficient invalidation of large memory spaces. For example, SFA 106 may allow a software process to be offloaded from manually stepping through page table entries or range map entries to invalidate specific entries.

Network Memory Protocol

In FIG. 1, when SFA 106 processes network memory request 108 using transport handler 114 and remote memory request handler 112, or when communicating network memory request 108 between point C and point D, a network memory protocol may be used. In some embodiments, the network memory protocol may include a request-response message protocol. This request-response message protocol allows a message of a request or response to be encoded as a payload on top of an arbitrary transport protocol. The message encoding may be mapped to either datagram-based protocols (e.g., UDP) or byte-stream-based protocols (e.g., TCP).

The network memory protocol provides SFA 106 an option for supporting reliability when the underlying transport protocol does not provide reliability. For example, SFA 106 may use the network memory protocol to determine whether a response to a memory request has not been received in an expected time window, or whether a negative acknowledgment of the request is received or no acknowledgment of the request is received (e.g., the request was explicitly NACK'd). Based on these determinations, SFA 106 may notify the requester to retransmit the request. In some cases such as when simple UDP protocol is used, SFA 106 itself will likely retransmit the request (e.g., handled by transport handler 114).

The reliability support at the network memory protocol layer may allow SFA 106 to further provide system resiliency enhancements. For example, a remote memory endpoint communicated to SFA 106 may be duplicated into a primary/secondary pair. Both the primary and secondary would receive all memory modifications, but only the primary would receive memory reads. By using the network memory protocol, when the primary failed, the failed requests would be automatically retried on the secondary. At this point, the secondary becomes the new primary, and a new secondary will be brought up in the background. This process can be extended to an arbitrary number of mirror machines, thereby improving resiliency. In another example, if a single network memory endpoint receives an impending failure notification (e.g., running on battery backup after the loss of power), the endpoint may immediately NACK all incoming network memory requests and copy all memory contents to an on-demand backup location. When the backup location is online and consistent, SFA 106 allows the requestor to retry all the network memory requests to the backup location.

Network Memory Protocol Authentication

Remote authorization and revocation of access is an important consideration for a scalable remote memory protocol. In some embodiments, the network memory protocol may include a cryptographic authentication token on each request that is associated with an authentication domain. The authentication domain may map the transport flow identifier (ID), the associative range ID, or the page ID with a respective authentication key/token (or secret) provided by the transport layer, associative range map entry, or page table entry. In some embodiments, authentication associated with network memory protocol is performed between points C and D shown in FIG. 1.

In some embodiments, authentication may be performed only at point D in FIG. 1. This allows for a responder to unilaterally revoke access to a given authentication domain at a variety of granularities. Therefore, when a subsequent request fails to authenticate, a response indicating the request was unauthorized will be triggered and sent back to the requester without any further processing of the request. In some embodiments, a response back to a requestor may be similarly authenticated, typically with a transport-based authentication domain.

Memory Request Handler Identification

In some embodiments, memory request handler identification may occur when network memory request 108 is to be delivered to a memory request handler for processing, e.g., at point B of In FIG. 1. In some embodiments, different from a normal CPU page table, global memory page table entries of SFA 106 may provide an identifier that maps to an appropriate network address of a memory request handler (e.g., 110 or 112). This identifier may simply indicate a local SFA memory request handler 110. The identifier does not include full network headers in this simple case. On the other hand, in the most extreme case, the identifier may be an arbitrary network header that identifies any internet-accessible memory request handler. In other embodiments, a field that indexes into a table of network headers may also be used in memory request handler identification.

Transport Handler

A transport handler (e.g., 114) may handle data using a network transport protocol, for example, when communicating data with remote memory request handler 112. A network transport protocol may be used to carry or transmit network memory requests and network memory responses. Although not required, reliable transport is usually used. Data ordering, however, is optional and dependent on the host memory access ordering semantics. For data transport, both datagram/packet/message-based (e.g., UDP) or byte-stream-based (e.g., TCP) transport protocols may be used.

In some embodiments, the transport layer data processing may be implemented by a device attached to SFA 106, software running on a processor of SFA 106, or by a hardware unit of SFA 106. In some embodiments, when processing network memory request 108 over the transport layer, SFA 106 allows only the payload of network memory request 108 to be carried by a datagram-based or byte-stream-based protocol.

In some implementations, a network memory protocol may be jointly optimized with the transport protocol. For example, a network memory protocol may allow memory response timeouts, and lead to retransmissions of memory requests. The memory requests may be discarded as duplicates. In such a case, the transport itself is not required to be reliable, which means no or less reliability requirement for a transport protocol. In another example, in order to save buffer capacity, a memory response retransmission buffer may store a NACK. The NACK, instead of a full data response, gets retransmitted in the event the response is lost in the network. This forces a retry of the entire request.

Memory Request Handler

A memory request handler is responsible for receiving and executing a memory request, and generating an appropriate memory response. The memory request handler then sends the response back to the requestor that sent the memory request. In some embodiments, a memory request handler may be a local memory request handler 110 and/or remote memory request handler 112, as shown in FIG. 1.

In some embodiments, a memory request handler may be specifically designed to be flexibly implementable in an SFA-attached device (software or hardware), software running on an embedded SFA processor, or SFA hardware. The specific designs of the memory request handler may enable various implementations including one-sided remote memory operations as well as host-software-in-the-loop processing assist. Additionally, the implementation of a memory request handler is explicitly abstracted, and thus a memory requestor would not be required to have any knowledge of the implementation approach used by a particular memory request handler.

Performance Optimization: Local Cache

When processing a memory request, SFA 106 may manage a local cache of cacheable remote memory. In some embodiments, this cache may be homed/resided in the local SRAM of SFA 106 or any locally-accessible memory space to SFA 106 (e.g., CPU DRAM). The cache management structures used to manage the cache, however, would reside in SFA 106 itself.

SFA 106 may use caching policy to manage the local cache of cacheable remote memory. In some embodiments, the caching policy may be driven by a variety of inputs. The inputs may include, but are not limited to, page table entry or associative region entry hint fields, hit/miss counts (e.g., tracked in SFA 106 or in page table entries), network congestion or available bandwidth, and incoming address range hints, etc.

In some embodiments, SFA 106 may also apply prefetching optimizations when managing the local cache. For example, SFA 106 may determine to promote a single remote cacheline read into a full remote page read (including the cacheline), and then remap the page locally to a locally available DRAM page. Once the remapping is implemented, future accesses would hit the local DRAM page instead of the remote DRAM page (until it is evicted). As a result, this caching scheme ensures that in-flight writes would not race or compete with any in-flight moves, thereby preventing future reads from reading stale data.

In some embodiments, the eviction policy, applied by SFA 106 in managing the local cache, may either be a software process or a hardware process. When a software process of the eviction policy is used, SFA 106 acts on access statistics provided by hardware to evict cold data from the cache.

Performance Optimization: Page Rotation

As an expansion on caching optimization, SFA 106 allows the system memory management software process to explicitly move hotter remote memory pages closer and/or move colder pages further away. By moving hotter remote memory pages closer, these memory pages may be moved into the CPU's native DRAM space or into a local SFA-attached DRAM. By moving the colder pages further, the memory pages may be evicted from local DRAM locations into remote DRAM locations.

SFA 106 may determine the hot and/or cold rankings of a page based on a policy. In some embodiments, SFA 106 may use hardware-collected access statistics as the input signals to the policy for determining page hot/cold rankings. The hardware-collected access statistics may be associated with an SFA-mediated memory request. The statistics may also be associated with any CPU-specific techniques for pages mapped in the CPU's direct-attached DRAM. In some embodiments, the SFA hardware may provide efficient mechanisms to move pages between local and remote memory locations in a way that removes race conditions. This may ensure access integrity (e.g., a page move from a remote location to a local location may need to be stalled until any in-flight modifications have been committed) and update appropriate page table entries to point to new locations.

Implementation System

Figure 2:
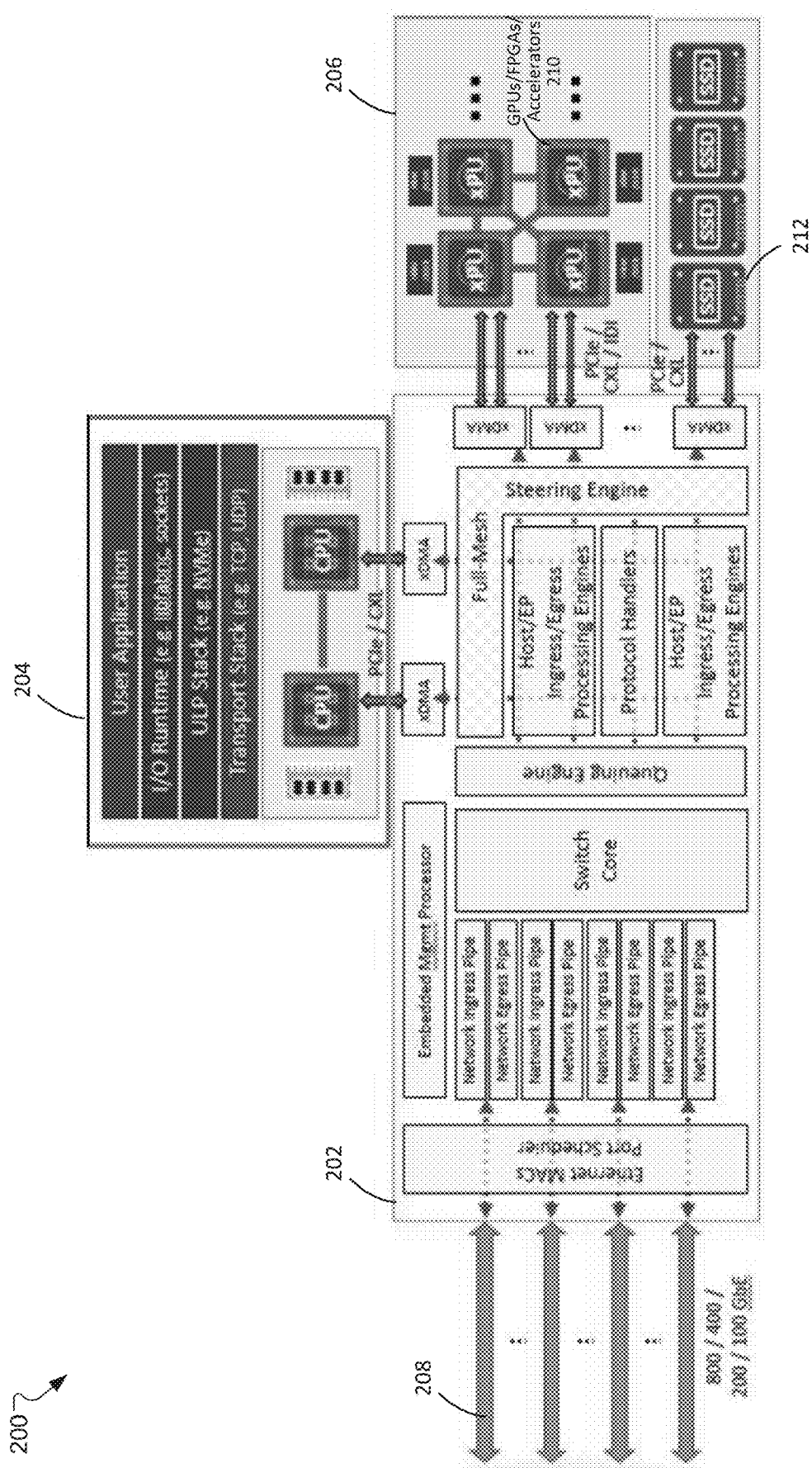
FIG. 2 illustrates an exemplary server fabric adapter architecture for accelerated and/or heterogeneous computing systems in a data center network, according to some embodiments.

FIG. 2 illustrates an exemplary server fabric adapter architecture 200 for accelerated and/or heterogeneous computing systems in a data center network. In some embodiments, a server fabric adapter (SFA) 106 may connect to one or more controlling host CPUs 204, one or more endpoints 206, and one or more Ethernet ports 208. An endpoint 206 may be a GPU, accelerator, FPGA, etc. Endpoint 206 may also be a storage or memory element 212 (e.g., SSD), etc. SFA 106 may communicate with the other portions of the data center network via the one or more Ethernet ports 208.

In some embodiments, the interfaces between SFA 106 and controlling host CPUs 204 and endpoints 206 are shown as over PCIe/CXL 214*a* or similar memory-mapped I/O interfaces. In addition to PCIe/CXL, SFA 106 may also communicate with a GPU/FPGA/accelerator 210 using wide and parallel inter-die interfaces (IDI) such as Just a Bunch of Wires (JBOW). The interfaces between SFA 106 and GPU/FPGA/accelerator 210 are therefore shown as over PCIe/CXL/IDI 214*b*.

SFA 106 is a scalable and disaggregated I/O hub, which may deliver multiple terabits-per-second of high-speed server I/O and network throughput across a composable and accelerated compute system. In some embodiments, SFA 106 may enable uniform, performant, and elastic scale-up and scale-out of heterogeneous resources. SFA 106 may also provide an open, high-performance, and standard-based interconnect (e.g., 800/400 GbE, PCIe Gen 5/6, CXL). SFA 106 may further allow I/O transport and upper layer processing under the full control of an externally controlled transport processor. In many scenarios, SFA 106 may use the native networking stack of a transport host and enable ganging/grouping of the transport processors (e.g., of x86 architecture).

As depicted in FIG. 2, SFA 106 connects to one or more controlling host CPUs 204, endpoints 206, and Ethernet ports 208. A controlling host CPU or controlling host 204 may provide transport and upper layer protocol processing, act as a user application "Master," and provide infrastructure layer services. An endpoint 206 (e.g., GPU/FPGA/accelerator 210, storage 212) may be producers and consumers of streaming data payloads that are contained in communication packets. An Ethernet port 208 is a switched, routed, and/or load balanced interface that connects SFA 106 to the next tier of network switching and/or routing nodes in the data center infrastructure.

In some embodiments, SFA 106 is responsible for transmitting data at high throughput and low predictable latency between:

Network and Host;
Network and Accelerator;
Accelerator and Host;
Accelerator and Accelerator; and/or
Network and Network.

In general, when transmitting data/packets between the entities, SFA 106 may separate/parse arbitrary portions of a network packet and map each portion of the packet to a separate device PCIe address space. In some embodiments, an arbitrary portion of the network packet may be a transport header, an upper layer protocol (ULP) header, or a payload. SFA 106 is able to transmit each portion of the network packet over an arbitrary number of disjoint physical interfaces toward separate memory subsystems or even separate compute (e.g., CPU/GPU) subsystems.

By identifying, separating, and transmitting arbitrary portions of a network packet to separate memory/compute subsystems, SFA 106 may promote the aggregate packet data movement capacity of a network interface into heterogeneous systems consisting of CPUs, GPUs/FPGAs/accelerators, and storage/memory. SFA 106 may also factor, in the various physical interfaces, capacity attributes (e.g., bandwidth) of each such heterogeneous systems/computing components.

In some embodiments, SFA 106 may interact with or act as a memory manager. SFA 106 provides virtual memory management for every device that connects to SFA 106. This allows SFA 106 to use processors and memories attached to it to create arbitrary data processing pipelines, load balanced data flows, and channel transactions towards multiple redundant computers or accelerators that connect to SFA 106. Moreover, the dynamic nature of the memory space associations performed by SFA 106 may allow for highly powerful failover system attributes for the processing elements that deal with the connectivity and protocol stacks of the system 200.

Flow Diagrams of Memory Request Processing using SFA

Figure 3:
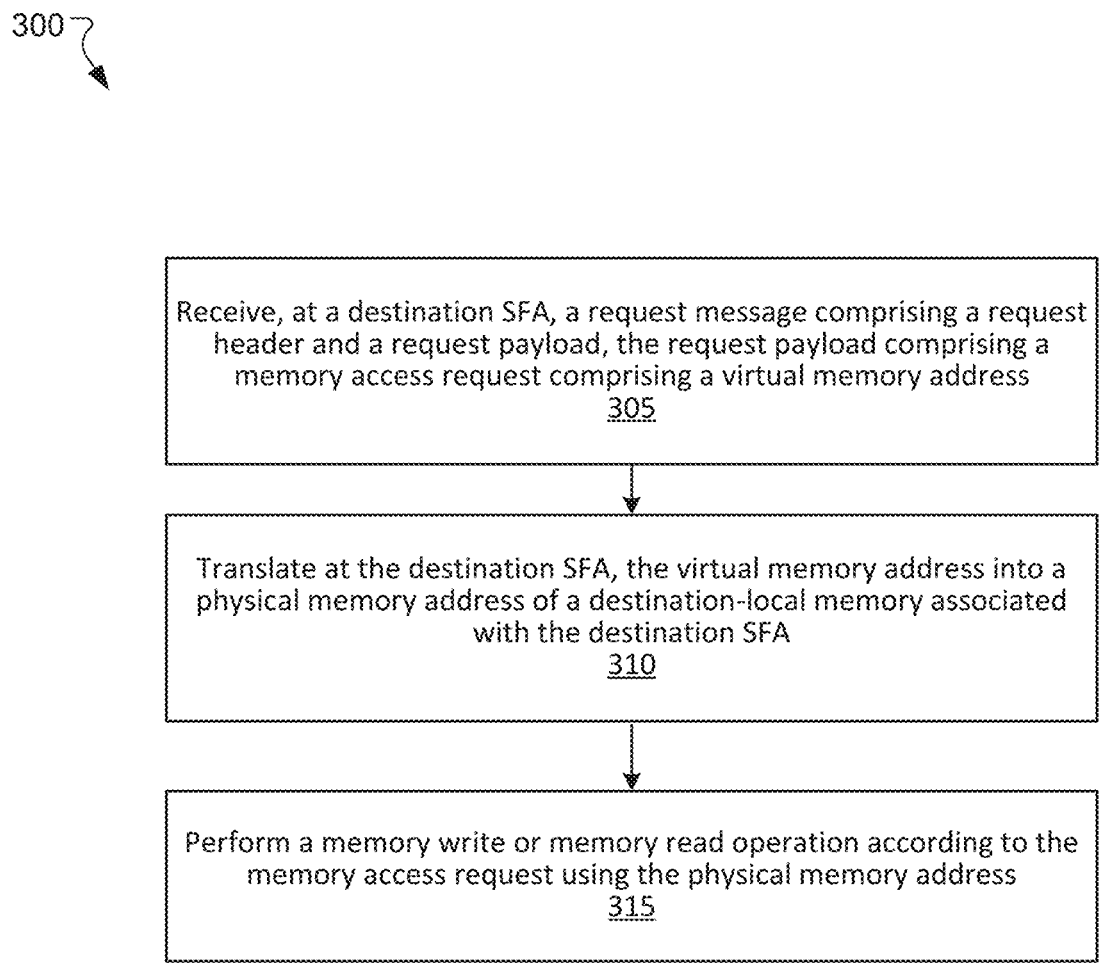
FIG. 3 illustrates an exemplary process of providing memory access to a server from the perspective of a destination SFA, according to some embodiments.

FIG. 3 illustrates an exemplary process 300 of providing memory access to a server from the perspective of a destination SFA, according to some embodiments. In some embodiments, an SFA communication system includes an SFA (e.g., SFA 106 of FIG. 1) communicatively coupled to a plurality of controlling hosts, a plurality of endpoints, a plurality of network ports, as well as one or more other SFAs. In the example of FIG. 3, SFA 106 is considered as a destination SFA to perform the steps of process 300.

At step 305, a request message is received at a destination SFA from a source SFA coupled to a server. The request message includes a request header and a request payload. The request payload includes a memory access request, and the memory access request includes a virtual memory address. In general, the request message indicates that the server coupled to the source SFA has made the memory access request, and has provided the virtual memory address.

At step 310, the virtual memory address is translated at the destination SFA into a physical memory address of a destination-local memory associated with the destination SFA. At step 315, according to the memory access request, either a memory write operation or a memory read operation is performed using the physical memory address. In various embodiments, steps 305-315 may correspond to the operations performed by remote memory request handler 112 shown in FIG. 1.

In some embodiments, upon receiving the memory access request, a response to the request may be synthesized. The response may include a response header and a response payload. The response may then be transmitted to the source SFA. A response to the request is optional, which may or may not be generated and sent back to the requestor, i.e., the source SFA.

The memory access request in the request payload may include a memory read request. When a response is generated, the response payload may include a block of memory associated with the physical memory address. In such a "read" request case, the memory block accessed from the memory that is local to the destination SFA, i.e., the destination-local memory used in step 310, may be sent to the requesting or source SFA as part of the response.

In other embodiments, the memory access request in the request payload includes a memory write request and a block of memory. When a response is generated, the response payload may include an acknowledgment, and the block of memory is stored at the destination-local memory using the physical memory address. In such a "write" request case, the memory block may be provided in the incoming message by the server coupled to the source SFA. The memory block may be written to the memory that is local to the destination SFA (e.g., the destination-local memory used in step 310). Also, an acknowledgment may be sent to the requesting, i.e., source SFA as part of the response. The acknowledgement may ultimately be provided to the server coupled to the source SFA.

In some embodiments, the request message received at the destination SFA may include a cryptographic authentication token. Based on this token, the destination SFA may authenticate the source SFA or the server coupled to the source SFA and requesting memory access via the source SFA. In some embodiments, if the authentication of the source SFA or the server fails, the operations in steps 310 and 315 are not performed. In some embodiments, a subsequent request message from the source SFA may be received at the destination SFA, but a NACK response may be transmitted to the source SFA, for example, if the memory system associated with the destination SFA, which is or includes the destination-local memory, has failed or is expected to fail or become unavailable.

Figure 4:
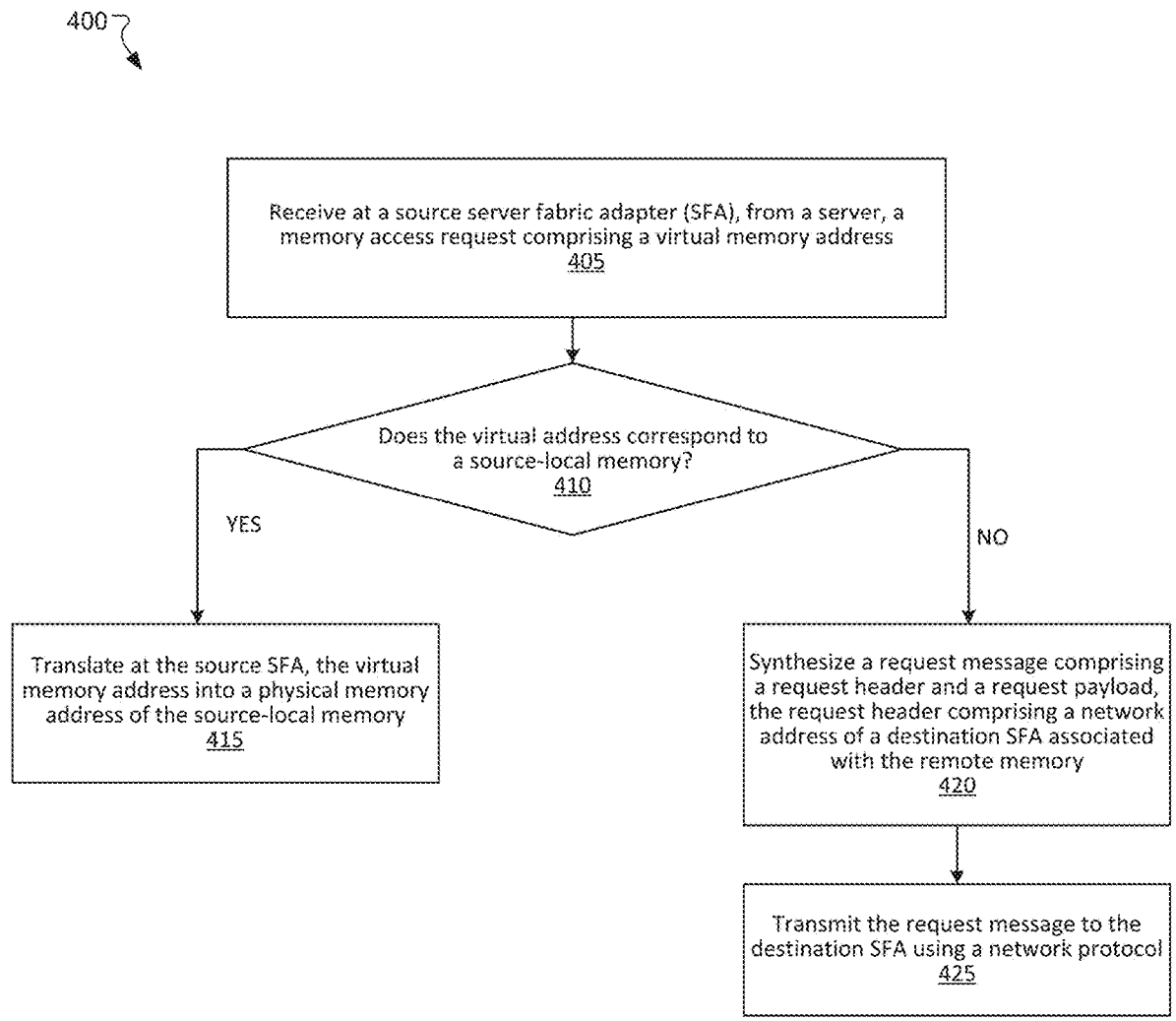
FIG. 4 illustrates an exemplary process of providing memory access to a server from the perspective of a source SFA, according to some embodiments.

FIG. 4 illustrates an exemplary process 400 of providing memory access to a server from the perspective of a source SFA, according to some embodiments. In some embodiments, an SFA communication system includes an SFA (e.g., SFA 106 of FIG. 1) communicatively coupled to a plurality of controlling hosts, a plurality of endpoints, a plurality of network ports, as well as one or more other SFAs. In the example of FIG. 4, SFA 106 is considered as a source SFA to perform the steps of process 400.

At step 405, a memory access request is received at a source SFA from a server, e.g., the CPU 102 of FIG. 1. The memory access request may include a virtual memory address. At step 410, it is determined whether the virtual address corresponds to a source-local memory associated with the source SFA (e.g., the memory coupled to the memory request handler 110 of FIG. 1). The virtual address may also correspond to a remote memory. In some embodiments, the source SFA (e.g., SFA 106) may make the determination whether the virtual address corresponds to the source-local memory or the remote memory using associative mapping.

In response to a determination that the virtual address corresponds to the source-local memory, at step 415, the virtual memory address may be translated, by the source SFA, into a physical memory address of the source-local memory. However, if the virtual address corresponds to the remote memory, then at step 420, a request message may be synthesized. The request message may include a request header and a request payload. The request header may include a network address of a destination SFA associated with the remote memory. The request payload includes the memory access request. Once the request message is synthesized, at step 425, the request message is transmitted to the destination SFA using a network protocol. Different types of network protocols may be used. For example, a network protocol may be a datagram-based protocol (e.g., UDP) or a byte-stream-based protocol (e.g., TCP).

If the underlying protocol does not support reliable network transport, SFA 106 may implement reliable network transport. In some embodiments, SFA 106 first awaits a response from the destination SFA. If no response is received during a timeout period or if a no-acknowledgment (NACK) response is received, SFA 106 may resend the request message to the destination SFA or to a different destination SFA.

In some embodiments, the request header includes a cryptographic authentication token associated with the remote memory. In that case, upon receiving the request message, the destination SFA can authenticate the requesting, i.e., the source SFA and/or the server coupled to the source SFA. The authentication may include determining whether the source SFA and/or the server are authorized to access to the remote memory. In other embodiments, the authentication may be performed at the source SFA, as an alternative to or in addition to the authentication performed at the destination SFA.

In some embodiments, the memory access request may be received from the server at the source SFA via a particular one of a number of interfaces. In this case, based on the particular interface through which the request was received, the nature of the requested memory access may be determined. In some embodiments, the determined nature is of type prefetch, and the memory access request may then be modified to include not just a location/block associated with the virtual address, but a request for one or more pages associated with the virtual address. If the server needs to access memory corresponding to virtual addresses that correspond to the requested page(s), such memory would be readily available to the server, e.g., in the server memory or in a local memory associated with the server. Thus, the server can access such memory without the need to send additional request messages to the destination SFA. In this way, the cache operation is optimized, by accessing a page instead of a cache line.

In some embodiments, SFA 106, acting as a source SFA, may monitor memory access requests. Each memory request may include respective virtual memory address corresponding to the remote memory. SFA 106 may then obtain one or more pages associated with the respective virtual addresses from the remote memory and store the one or more pages in the source-local memory. In some embodiments, the subsequent memory access request received at the source SFA includes the corresponding virtual memory address that is within the respective virtual addresses. In response, a corresponding virtual memory address in the subsequent memory access request may be translated into a corresponding physical memory address of the source-local memory at the source SFA, and the memory access request would be handled by the source-local memory instead of the destination-local memory. Thus, by copying one or more "hot" pages of the remote memory into the source-local memory, page rotation is achieved, which can improve the overall memory access.

Page rotation may include, in addition to or as an alternative to copying the "hot" pages from a remote memory to a local memory, moving out "cold pages" from a local memory to a remote memory. For example, one or more "cold" pages of the local memory, i.e., the pages that have not been accessed during a certain time window, or are accessed at a frequency less than a specified threshold, may be moved to the remote memory, and subsequent requests corresponding to the portion of the moved memory are transmitted to the remote memory via a destination SFA.

In some embodiments, the source SFA (e.g., SFA 106) may select one or more pages that are within the source-local memory and that are associated with various virtual addresses in monitored memory access requests received from one or more servers coupled to the source SFA. The source SFA may move out the one or more pages to a remote memory. In response to receiving, at the source SFA, a subsequent memory access request including a corresponding virtual memory address that is within the various virtual addresses, the source SFA may synthesize a subsequent request message and transmit the subsequent request message to a destination SFA using a network protocol. The subsequent request message may include a corresponding request header and a corresponding request payload. The corresponding request header includes the network address of the destination SFA, and the corresponding request payload includes the subsequent memory access request.

Thus, a memory access request corresponding to a cold page may be handled by a remote memory instead of by a local memory. Overall, moving cold pages to one or more remote memories can improve performance, because the local memory would be freed up and can cache hot pages. The access to the hot pages would be faster compared to accessing them from a remote memory.

ADDITIONAL CONSIDERATIONS

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for providing memory access to a server, the method comprising:
   receiving at a source server fabric adapter (SFA), from a server, a plurality of memory access requests, each memory access request comprising a virtual memory address;
   translating a first memory access request from the plurality of memory access requests into a first network memory request associated with a local memory request handler;
   translating at the source SFA, the virtual memory address for the first memory access request into a physical memory address of a source-local memory;

translating a second memory access request from the plurality of memory access requests into a second network memory request associated with a remote memory request handler;

using a transport handler to apply transport headers and insert the second network memory request into a network flow for transmitting to the remote memory request handler;

synthesizing a request message comprising a request header and a request payload, the request header comprising a network address of a destination SFA associated with a remote memory, and the request payload comprising the second memory access request; and transmitting the request message to the destination SFA using a network protocol, wherein translating the first memory access request and the second memory access request comprises prioritizing and performing one or more of a page table lookup function or an associative range map function.

2. The method of claim 1, wherein the network protocol comprises a datagram-based protocol or a byte-stream-based protocol.

3. The method of claim 1, further comprising:

awaiting a response from the destination SFA; and upon receiving no response during a timeout period or receiving a no-acknowledgement (NACK) response, resending the request message to the destination SFA or to a different destination SFA.

4. The method of claim 1, wherein the request header comprises a cryptographic authentication token associated with the remote memory.

5. The method of claim 1, further comprising authenticating the server for access to the remote memory.

6. The method of claim 1, wherein a third memory access request of the plurality of memory access requests is received from the server at the source SFA via a particular one of a plurality of interfaces, the method further comprising:

determining a nature of the requested memory access, based on the particular interface.

7. The method of claim 6, wherein the determined nature is of type prefetch, the method further comprising:

modifying the third memory access request to include a page request corresponding to a page associated with the virtual memory address for the third memory access request.

8. The method of claim 1, further comprising:

monitoring the plurality of memory access requests comprising a plurality of respective virtual memory addresses corresponding to the remote memory;

obtaining one or more pages associated with the plurality of respective virtual addresses from the remote memory and storing the one or more pages in the source-local memory; and in response to receiving at the source SFA, a subsequent memory access request comprising a corresponding virtual memory address that is within the plurality of respective virtual addresses, translating at the source SFA, the corresponding virtual memory address into a corresponding physical memory address of the source-local memory.

9. The method of claim 1, further comprising:

moving one or more pages within the source-local memory and associated with a plurality of virtual addresses to the remote memory; and in response to receiving at the source SFA, a subsequent memory access request comprising a corresponding virtual memory address that is within the plurality of virtual addresses:

synthesizing a subsequent request message comprising a corresponding request header and a corresponding request payload, the corresponding request header comprising the network address of the destination SFA, and the corresponding request payload comprising the subsequent memory access request; and transmitting the subsequent request message to the destination SFA using the network protocol.

10. A server fabric adapter (SFA) communication system comprising:

a source SFA communicatively coupled to a server and a source-local memory, the source SFA configured to:

receive from the server, a plurality of memory access requests, each memory access request comprising a virtual memory address;

translate a first memory access request from the plurality of memory access requests into a first network memory request associated with a local memory request handler;

translate the virtual memory address for the first memory access request into a physical memory address of a source-local memory, and translate a second memory request from the plurality of memory access requests into a second network memory request associated with a remote memory request handler, use a transport handler to apply transport headers and insert the second network memory request into a network flow for transmitting to the remote memory request handler;

synthesize a request message comprising a request header and a request payload, the request header comprising a network address of a destination SFA associated with a remote memory, and the request payload comprising the memory access request; and transmit the request message to the destination SFA using a network protocol, wherein to translate the first memory access request and the second memory access request, the source SFA is configured to prioritize and perform one or more of a page table lookup function or an associative range map function.

11. The SFA communication system of claim 10, wherein the source SFA is further configured to:

monitor the plurality of memory access requests comprising a plurality of respective virtual memory addresses corresponding to the remote memory;

obtain one or more pages associated with the plurality of respective virtual addresses from the remote memory and store the one or more pages in the source-local memory; and in response to receiving a subsequent memory access request comprising a corresponding virtual memory address that is within the plurality of respective virtual addresses, translate the corresponding virtual memory address into a corresponding physical memory address of the source-local memory.

12. The SFA communication system of claim 10, wherein the source SFA is further configured to:

move one or more pages within the source-local memory and associated with a plurality of virtual addresses to the remote memory; and in response to receiving a subsequent memory access request comprising a corresponding virtual memory address that is within the plurality of virtual addresses:

synthesize a subsequent request message comprising a corresponding request header and a corresponding request payload, the corresponding request header comprising the network address of the destination SFA, and the corresponding request payload comprising the subsequent memory access request; and transmit the subsequent request message to the destination SFA using the network protocol.

13. The method of claim 1, wherein translating the first memory access request and the second memory access request comprises prioritizing and performing the page table lookup function, and wherein performing the page table lookup function comprises mapping upper bits of an incoming address to a page table entry and determining a translated address from the page table entry.

14. The method of claim 1, wherein translating the first memory access request and the second memory access request comprises prioritizing and performing the associative range map function, and wherein performing the associative range map function comprises identifying a range map entry based on a set of linear memory ranges and calculating a translated address based on the identified range map entry.

* * * * *